(12) United States Patent
Akiba et al.

(10) Patent No.: US 8,259,257 B2
(45) Date of Patent: Sep. 4, 2012

(54) BACK LIGHT DEVICE, LIQUID CRYSTAL DISPLAY APPARATUS AND IMAGE DISPLAY APPARATUS USING THE SAME

(75) Inventors: Yutaka Akiba, Hitachi (JP); Ikuo Hiyama, Hitachinaka (JP); Kiyomi Nakamura, Hitachi (JP); Yoshinori Aono, Hitachinaka (JP); Makoto Tsumura, Hitachi (JP); Akitoyo Konno, Hitachi (JP); Norihiro Uemura, Hitachi (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 511 days.

(21) Appl. No.: 12/542,025

(22) Filed: Aug. 17, 2009

(65) Prior Publication Data

US 2010/0066943 A1 Mar. 18, 2010

(30) Foreign Application Priority Data

Sep. 12, 2008 (JP) ................................. 2008-234161

(51) Int. Cl.
*G02F 1/1335* (2006.01)
(52) U.S. Cl. ................. 349/69; 349/62; 349/68; 349/95; 257/90; 257/93
(58) Field of Classification Search .............. 349/62–68, 349/95
See application file for complete search history.

(56) References Cited

U.S. PATENT DOCUMENTS

| | | | |
|---|---|---|---|
| 4,933,601 A * | 6/1990 | Sagawa et al. ................ 313/500 |
| 2002/0167016 A1 | 11/2002 | Hoelen et al. | |
| 2007/0109779 A1 | 5/2007 | Sekiguchi et al. | |
| 2007/0242474 A1 | 10/2007 | Kim | |
| 2008/0088770 A1 * | 4/2008 | Hwang et al. ................... 349/64 |
| 2008/0303977 A1 * | 12/2008 | Sekiguchi et al. .............. 349/64 |
| 2009/0237593 A1 * | 9/2009 | Hoshi ............................ 349/62 |

FOREIGN PATENT DOCUMENTS

| | | |
|---|---|---|
| CN | 1462354 | 12/2003 |
| JP | 2007-157686 | 6/2007 |
| JP | 2007-287692 | 11/2007 |
| JP | 2007-311561 | 11/2007 |
| WO | WO 2007/136020 A1 | 11/2007 |

\* cited by examiner

*Primary Examiner* — Huyen Ngo
(74) *Attorney, Agent, or Firm* — Antonelli, Terry, Stout & Kraus, LLP.

(57) ABSTRACT

The liquid crystal display apparatus includes a liquid crystal panel and the back light device for emitting the light from a light source to the liquid crystal panel through a lens. The light source includes a first LED for emitting the light of a first color, a second LED for emitting the light of a second color, a third LED for emitting the light of a third color, a fourth LED for emitting the light of the third color, a fifth LED for emitting the light of the second color, and a sixth LED for emitting the light of the first color. The first, second, third, fourth, fifth and sixth LEDs are arranged on the wiring board in such a manner as to offset the deviation of the light distribution.

2 Claims, 21 Drawing Sheets

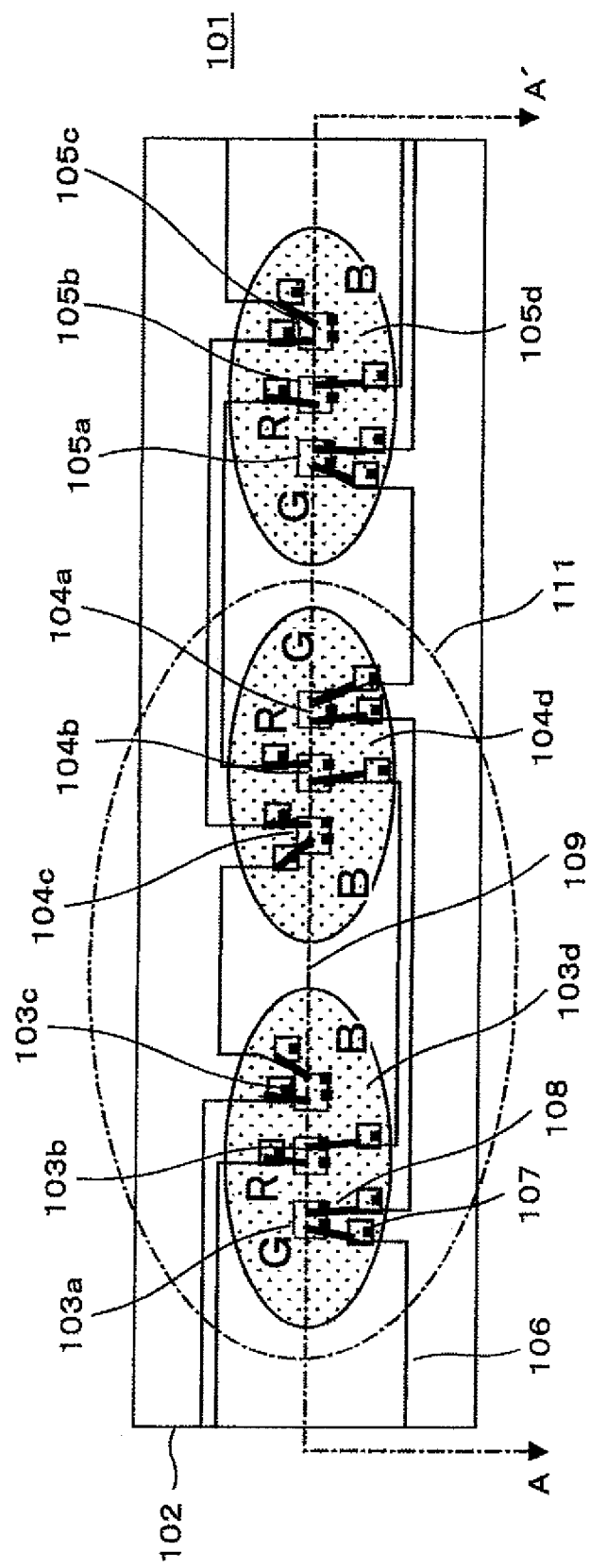

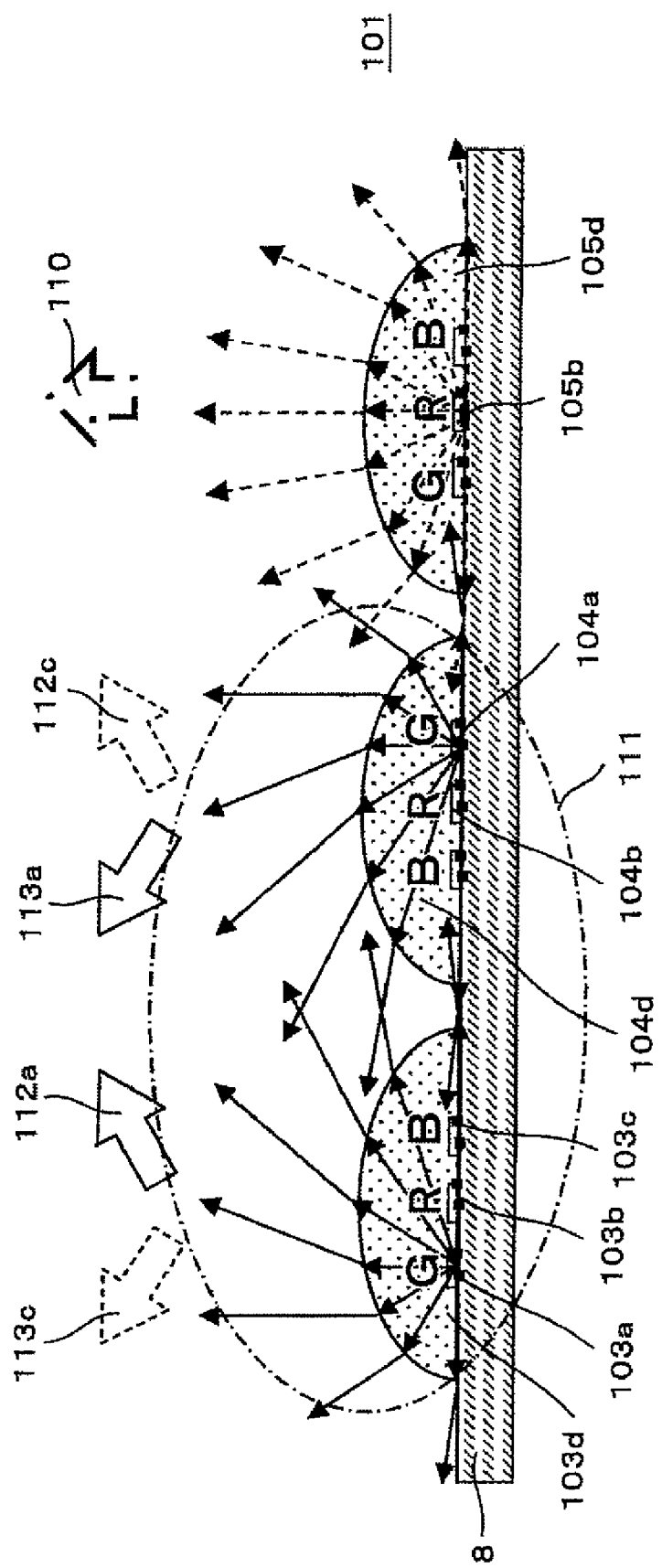

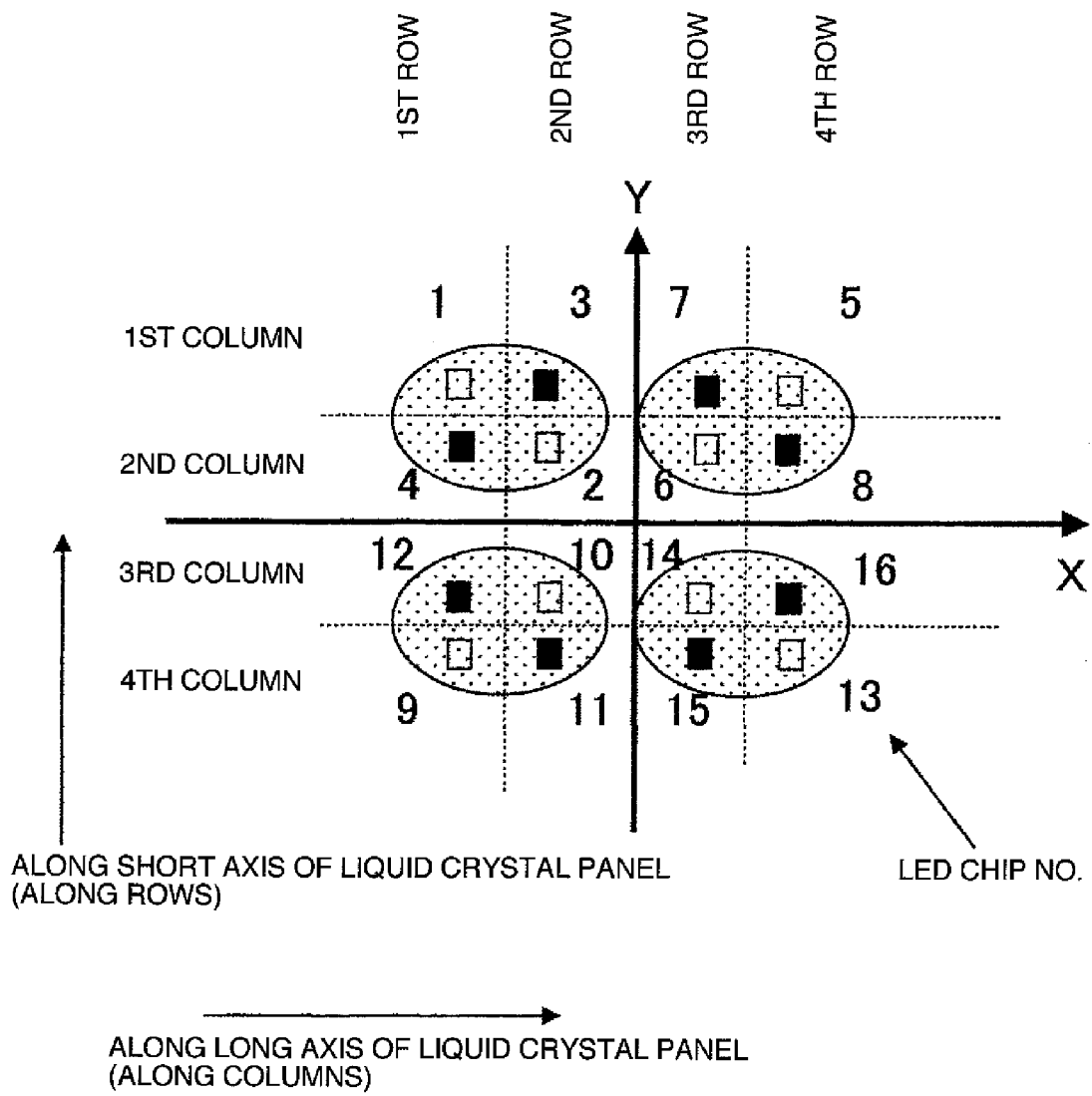

BACK LIGHT DEVICE, LIQUID CRYSTAL DISPLAY APPARATUS AND IMAGE DISPLAY APPARATUS USING THE SAME

BACKGROUND OF THE INVENTION

This invention relates to a back light device, a liquid crystal display apparatus and an image display apparatus using the back light device.

The back light device using a LED light source module is classified into edge type and direct type according to the layout structure of the light source. In the back light device of edge type, the light source is arranged on the side surface of a light guide plate, and the light is radiated uniformly over the entire surface of the liquid crystal panel from the upper surface of the light guide plate. In the back light device of direct type, on the other hand, the light source is arranged on the lower surface of the liquid crystal panel, and the light is radiated uniformly on the panel front surface through a diffusion plate or the like. JP-A-2007-287692 illustrates a light source module with a plurality of LED chips arranged sequentially in a line on the substrate, and JP-A-2007-311561 a display device of direct type.

SUMMARY OF THE INVENTION

From the viewpoint of the reliability (seal structure) of the light source module and the color mixing (prevention of the breakup of the three colors RGB), the LED chip (three colors RGB) after D/B and W/B is preferably covered by an integrated structure using a transparent resin. Further, in the case where the light convergence is required, the transparent resin is formed in the shape of a lens. The structure in which a plurality of LED chips of the three colors RGB are covered with one transparent resin member or a lens unit takes advantage of the fact that, as compared with the structure in which each LED chip is covered with a lens, the RGB colors are liable to be mixed by the total reflection in the lens.

FIGS. 21A to 21C are sectional views showing the light distribution for each LED chip arrangement with a lens in the shape of a hemisphere or an elongate semi-ellipsoid. FIG. 21A is a sectional view showing a case in which the LED chip is arranged at the central portion on the symmetry axis of the lens, in which the light fluxes are emitted symmetrically in lateral direction and thus distributed uniformly. FIGS. 21B and 21C, on the other hand, are sectional views with the LED chip displaced leftward and rightward, respectively, from the central portion (center point) of the lens. In this case, the light fluxes are emitted asymmetrically in the lateral direction, and therefore, not distributed uniformly. In the case where the LED chips of the three colors RGB are arranged on the center axis of the aforementioned single lens with the symmetrical position thereof limited to the central portion (center point), the definite size of a plurality of chips poses the problem that only one chip of one color can be arranged at the center of the lens. Also, an excessive concentration of a plurality of chips at the central position would cause the absorption loss and absorption-emission, and therefore, the arrangement of a plurality of chips at the central position has its own limit. In other words, it is difficult to arrange all the chips of any size at the center of the lens. Therefore, the light source module harbors the problem that at least two out of the three RGB chips cannot produce a uniform light distribution for a predetermined lens shape, unavoidably resulting in a disuniform light distribution. This is also the case with a plurality of LED packages with the three RGB chip as a basic unit, in which case the disuniformity is further accumulated and amplified.

Apart from the edge-type structure shown in FIGS. 21A to 21C, the structure of direct type is also considered to pose the same problem of disuniform light distribution.

The object of this invention is to provide a back light device with a plurality of LED chips mounted thereon and a liquid crystal apparatus and an image display apparatus using the back light device, in which the color shading is removed by securing the uniformity of the distribution of the emitted light.

In order to achieve the object described above, according to this invention, there are provided a back light device of a liquid crystal display apparatus and an image display apparatus including a liquid crystal panel and the back light device having a wiring board with a light source arranged thereon for emitting the light to the liquid crystal panel through a lens, wherein the light source includes a first LED having a first light emission color, a second LED having a second light emission color, a third LED having a third light emission color, a fourth LED having the third light emission color, a fifth LED having the second light emission color and a sixth LED having the first light emission color, and wherein the first, second, third, fourth, fifth and sixth LEDs are arranged in such a manner as to distribute the emitted light uniformly.

In the back light device with a plurality of LED chips mounted thereon and the liquid crystal display apparatus and the image display apparatus using the back light device according to this invention, the color shading can be removed by uniformly distributing the emitted light.

Other objects, features and advantages of the invention will become apparent from the following description of the embodiments of the invention taken in conjunction with the accompanying drawings.

BRIEF DESCRIPTION OF THE DRAWINGS

FIG. 1 is a plan view of a light source module according to a first embodiment.

FIG. 2A is a sectional view taken in line A-A' in FIG. 1.

FIG. 17B is another plan view of the light source module according to the sixth embodiment.

DETAILED DESCRIPTION OF THE INVENTION

Figure 2B:
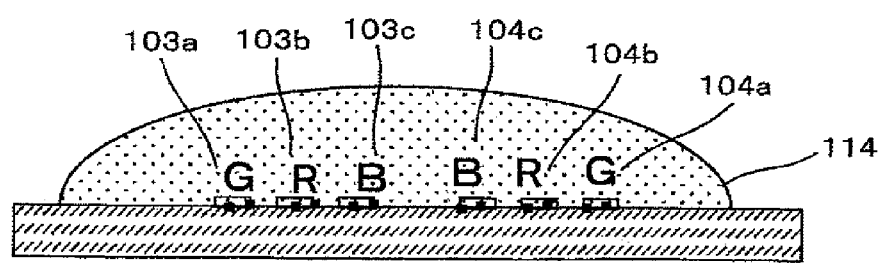
FIG. 2B is a diagram showing a case in which one lens is used as a paired lens.

This invention is described in detail below with reference to the drawings.

[First Embodiment]

FIG. 1 is a plan view of a light source module 101 according to this embodiment. The light source module 101 is configured of a plurality of LED packages each as a basic unit including a green LED chip 103a, a red LED chip 103b and a blue LED chip 103c mounted on a wiring board 102, and a lens 103d formed on these LED chips. The wiring board 102 is formed with a wire 106 for feeding power to the plurality of LED chips and an electrode 107 on an alumina board. The wire 106 and the electrode 107 are formed of a Cr/Ni wire plated with Au. Depending on the board material, a Cu/Ni wiring or a W/Ni wire may alternatively be plated with Au. The green LED chip 103a, the red LED chip 103b and the blue LED chip 103c are fixed by a die boding material on the wiring board 102. After that, the green LED chip 103a, the red LED chip 103b and the blue LED chip 103c are connected to the electrode 107 by bonding with a Au wire 108. The green LED chip 103a, the red LED chip 103b and the blue LED chip 103c, though connected in series in FIG. 1, may be connected in parallel or in both series and parallel taking the display condition or the drive condition into consideration. A discrete lens 103d is formed using a transparent resin such as silicon on the green LED chip 103a, the red LED chip 103b and the blue LED chip 103c. The lens 103d may be formed of epoxy resin. Incidentally, the lens covering the plurality of the LED chips is transparent, and, taking the refractive indexes of the LED chips and the air into consideration, has the refractive index of about 1.4 to 2.0. Preferably, however, the lens 103d has a refractive index as high as possible to reduce the probability and the rate at which the light emitted from the LED chips is totally reflected on the lens boundary. The lens 103d, though shown in the shape of an elongate semi-ellipsoid in preferential consideration of the number and interval of the chips to maintain the performance, may alternatively be semispherical (hemispherical). Each chip interval is required to have some length to prevent the absorption loss and the absorption-emission which otherwise might be caused by the proximate arrangement of the plurality of the LED chips. The light source module 101 is formed with a plurality of LED packages, and a plurality of LED chips are arranged at regular intervals on the symmetry axis 109 of the plurality of the packages. Although the red LED chip is arranged at the central portion (center point) of each LED package according to this embodiment, the LED chip of another color may alternatively be arranged at such a position. In the case where the LED chips of the three RGB colors packaged are different in height along the normal to the board surface, however, the LED chip of a color having the greatest height along the normal to the board surface among the three-color LED chips is advantageously and effectively mounted at the central portion in consideration of the arrangement to lead the bonding wire with respect to the lens shape, the improvement in light retrieval efficiency, the uniformity of the distribution characteristic and the symmetry.

FIG. 2A is a sectional view taken in line A-A' in FIG. 1. The uniform lateral distribution of the emitted light is secured for the red LED chip 103b arranged at the center of the lens 103d as for the red LED chip 105b in the lens 105d. The emitted light is distributed mainly in the direction 110. The red LED chip 103b is arranged at a symmetric position in the lens 103d such as the central portion (center point) thereof, and therefore, the emitted light thereof is uniformly distributed. The green LED chip 103a and the blue LED chip 103c, on the other hand, are displaced from the central portion (center point) of the lens 103d, and therefore, the emitted light thereof are not distributed uniformly but deviated.

According to this embodiment, the two adjoining lenses 103d and 104d are used to offset the deviation caused by each of the lenses. Specifically, the chips forming the lenses 103d and 104d in the LED packages are arranged in the order of GRB and BRG (or BRG and GRB), respectively, in point symmetry with each other with respect to the center points of the lenses 103d and 104d (the positions at which the red LED chip 103b and the red LED chip 104b are arranged) thereby to form a paired lens 111. The green LED chip 103a and the blue LED chip 103c arranged on the left and right sides, respectively, of the red LED chip 103b are displaced from the central portion of the lens 103d, and therefore, the distribution of the light from the green LED chip 103a and the blue LED chip 103c are deviated laterally of the lens 103d. To offset this deviation, the lens 103d is combined with the lens 104d in which the green LED chip 104a and the blue LED chip 104c are arranged in reverse order of the positions of the green LED chip 103a and the blue LED chip 103c thereby to form the paired lens 111. As a result, the light from the green LED chip 103a and the green LED chip 104a are distributed substantially in the directions 112a and 113a, respectively, and thus symmetrically combined to form the uniform light. Similarly, the light from the blue LED chip 103c and the blue LED chip 104c follow the directions 112c and 113c, respectively, and thus secure the uniformity of distribution.

It is understood from the foregoing description that the use of two LED packages arranged in reverse positions with respect to the center positions of the respective lenses makes it possible to hold the equal light distribution due to the light distribution symmetry between the two LED packages in spite of the deviation of individual light distribution. The uniform light distribution can be realized for each pair of the LED packages even in the case where the light source module uses a hemispherical or elongate semi-ellipsoidal lens. Specifically, the light can be distributed uniformly even in the case where, as shown in FIG. 2B, a single lens 114 covering a plurality of first LEDs and a plurality of second LEDs is used as a paired lens.

Figure 3:
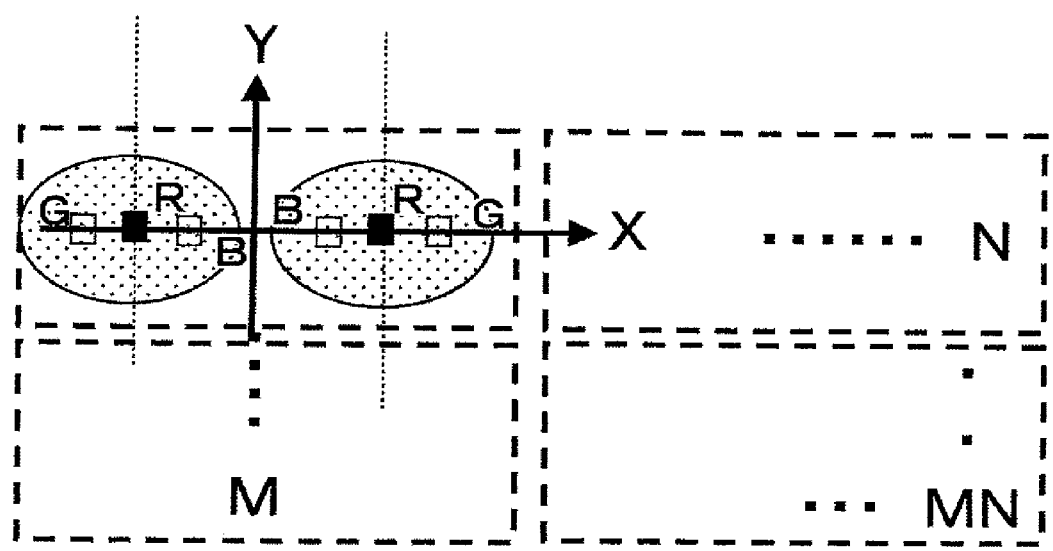
FIG. 3 is a diagram showing a configuration in which the paired lenses shown in FIG. 1 are arranged on a flat surface area.

FIG. 3 shows a configuration of a light source module in which a number NM of paired lenses 111 shown in FIG. 1 are arranged on a flat surface area (along XY axes). According to this invention, the surface of the wiring board on which the LED chips are arranged is defined as an XY flat surface. The uniformity of light distribution is improved by juxtaposing two lenses adjacently as a paired lens along X direction. By arranging MN lens pairs (paired lenses 111) each defined by dashed line as a basic unit in lateral and longitudinal directions (XY directions), the uniformity of light distribution is secured on the flat surface area.

Figure 4:
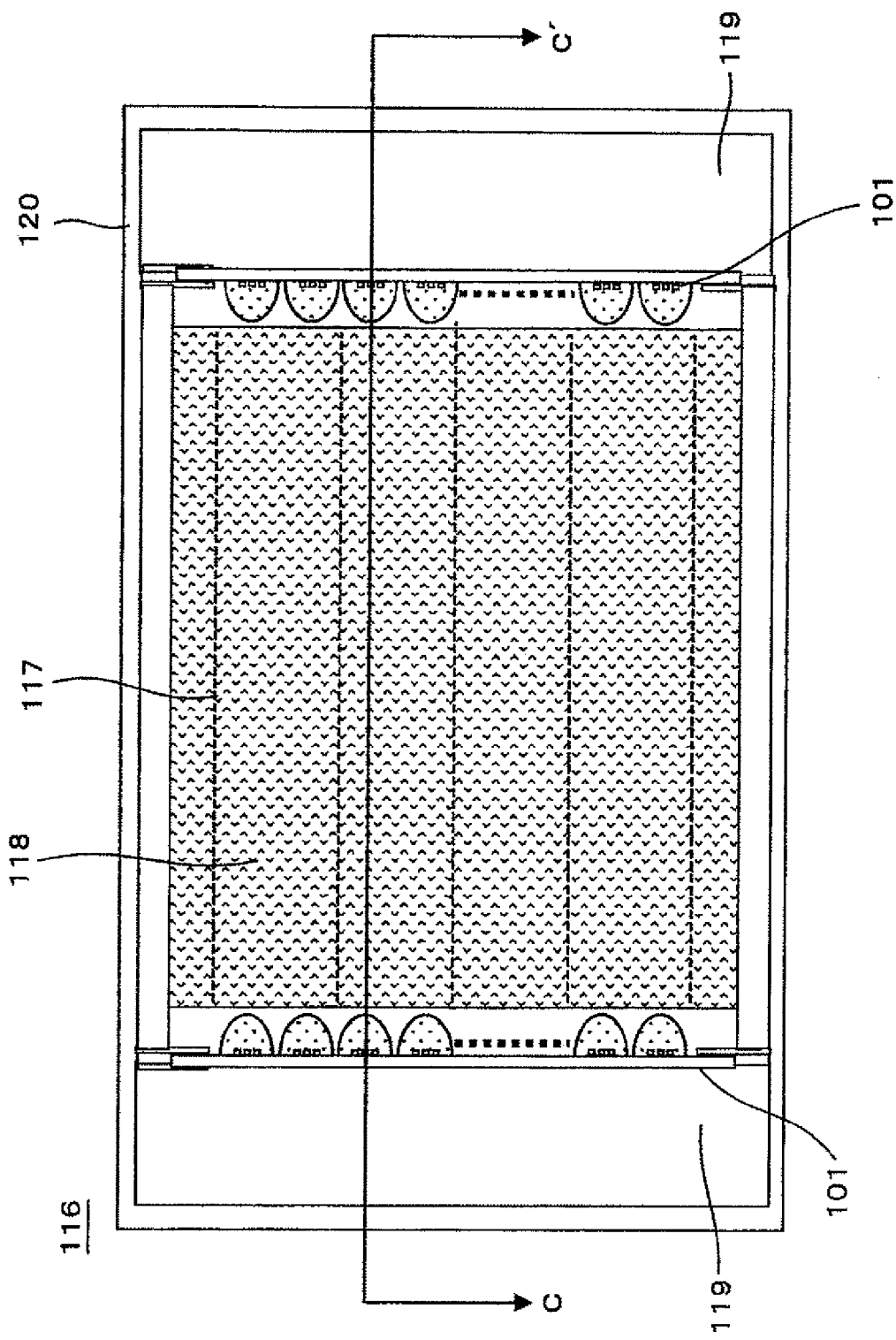
FIG. 4 is a plan view of the back light device shown in FIG. 1.

FIG. 4 is a plan view showing the back light device 116 using the light source module 101 shown in FIG. 1. The back light device 116 is configured of a light guide plate 118 having a plurality of partitioning walls 117 arranged at the central portion, light source modules 101 each formed of a plurality of LED packages, heat sinks 119 supporting the light source modules 101, respectively, and forming a heat radiation path. The back light device 116 also includes, though not shown, a diffusion plate arranged in the upper part of FIG. 5 and radiation fins arranged in the lower part of FIG. 4 and thermally integrated with the heat sinks 119. The plurality of the LED packages are arranged along the side surfaces of the liquid crystal panel. The light fluxes emitted from the light source modules 101 enter the two side surfaces of the light guide plate 118, and are efficiently retrieved from the upper part of the light guide plate 118 in FIG. 4 with a uniformly distributed brightness through a diffusion plate. The partitioning walls 117 are arranged at the interval M times (M≧1) that of the paired lens 111 to realize the one-dimensional area control. FIG. 4 shows a case in which M is 1.

Figure 5:
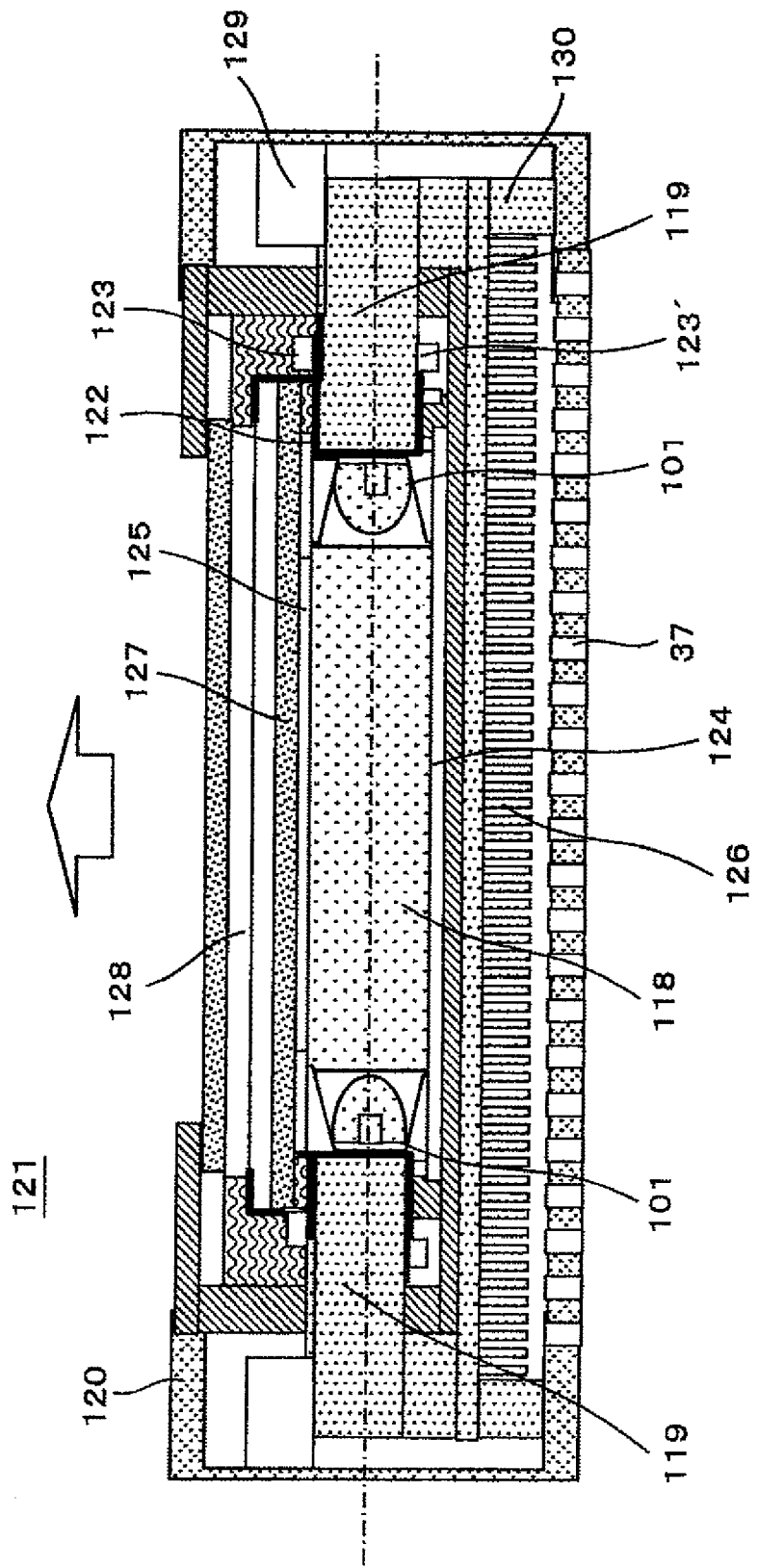
FIG. 5 is a sectional view of the image display apparatus taken in line C-C' of the back light device shown in FIG. 4.

FIG. 5 is a sectional view of the image display apparatus 121 having built therein the back light device 116 shown in FIG. 4. The image display apparatus 121 includes the back light device 116 configured of the light source modules 101, the wiring board 122, the drive circuit 123, the light guide plate 118, the reflection sheet 124, the diffusion plate 125, the heat sinks 119 and radiation fins 126. The liquid crystal panel 128 is held by the optical sheets 127. The back light device 116 and the liquid crystal panel 128 make up a liquid crystal display apparatus, which in turn is supported by a housing 120 to form an image display apparatus. The back light device 116, etc. are fixedly attached to the housing 120 through the support units 129 and the support units 130.

The drive circuit 123 and the drive circuit 123' are mounted on the wiring board 122 fixedly integrated with the heat sinks 119 to drive the LED light source modules 101 and the liquid crystal panel 128. The wiring board 122, with the heat generating units such as the LED light source modules 101 and the drive circuit 123 mounted thereon, is formed of a flexible board of a high heat radiation structure (low heat resistance structure) to reduce the thickness thereof. Though not shown in FIG. 5, the wiring board 12 has also mounted thereon a control circuit (a video signal processing circuit, an audio signal processing circuit and a back light control circuit connected thereto) for controlling the drive circuit 123, and a power circuit for supplying the voltage and the current to the control circuit and the drive circuit 123. The back light control circuit realizes a one-dimensional areal control system connected to the video signal processing circuit and corresponding to the partitioning walls 117. A combined structure (light retrieval structure) of the drive circuit 123, the drive circuit 123', the light guide plate 118 and the reflection sheet 124 further realizes a (2×N) two-dimensional areal control system with two lateral divisions and N longitudinal divisions (the number N of divisions adjusted by the partitioning walls 117). The drive circuit 123, the control circuit and the power circuit, like the light source modules 101, generate heat, and therefore, though not shown, a high heat radiation path is formed and secured. Specifically, space for mounting them is arranged locally in the heat sinks 119 and the radiation fins 126 to reduce the thickness and connected to the radiation structure and the low heat resistance structure.

Figure 6:
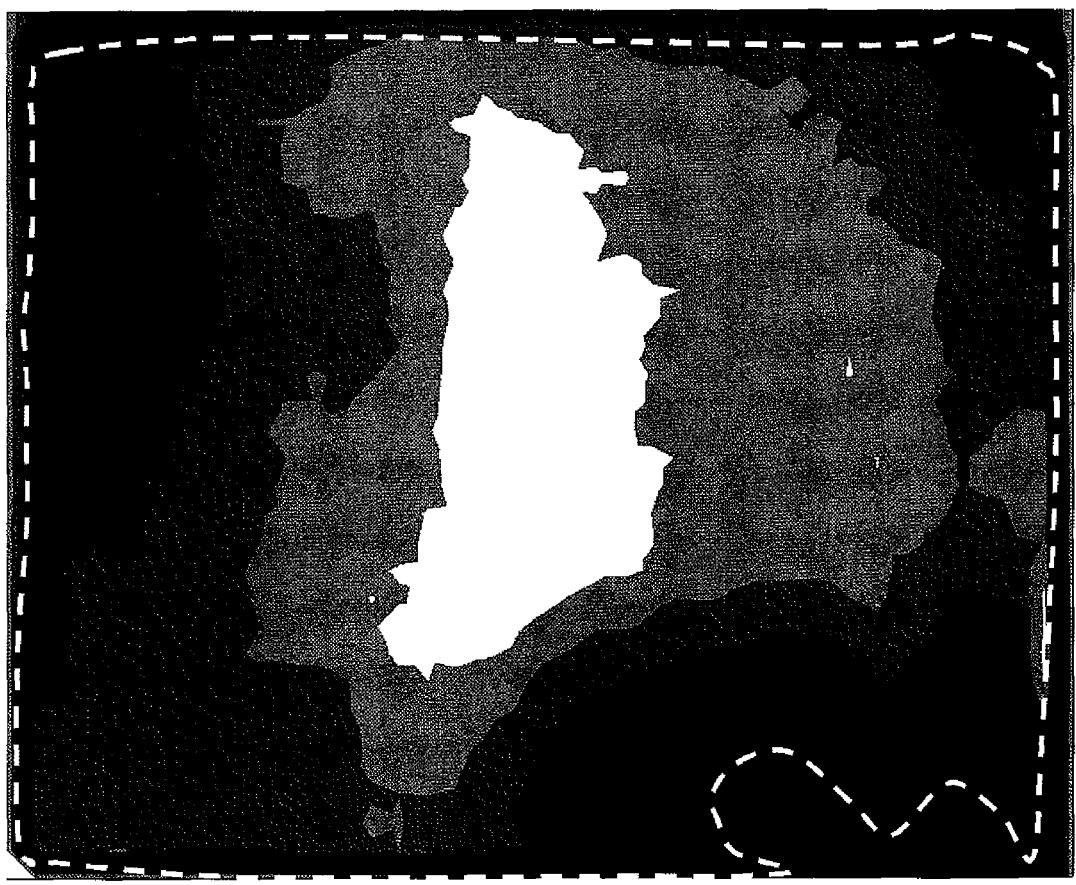
FIG. 6 shows the effect of the chromaticity distribution on the light retrieval surface of the back light device using the light source module shown in FIG. 1.

FIG. 6 shows a case using the light source modules 101 in which the chromaticity distribution is improved over the entire light retrieval flat surface of the back light device. The chromaticity difference Δxy is determined with the screen center as a reference.

Figure 7:
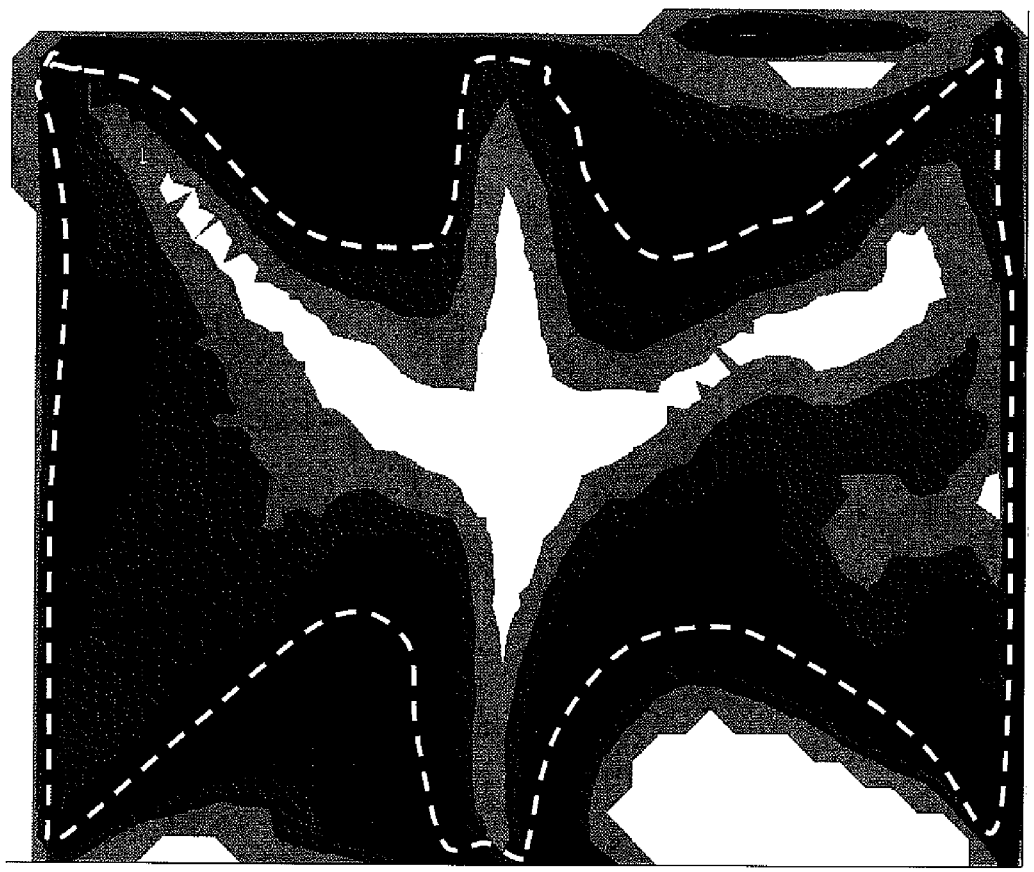
FIG. 7 shows the effect of the chromaticity distribution on the light retrieval surface of the back light device not using the light source module shown in FIG. 1.

FIG. 7 shows the chromaticity distribution over the entire light retrieval flat surface of the back light device for a case not using the light source module 101 shown in FIG. 1 (before improvement). The chromaticity difference required for the human being to recognize as white is defined by dashed line. By using the light source module 101 according to this invention for the back light device, the liquid crystal display apparatus and the image display apparatus, the area within the required chromaticity difference Δxy spreads from the area defined by the dashed line in FIG. 7 to the area defined by the dashed line in FIG. 6. Basically, therefore, it can be confirmed that the uniformity of light distribution is secured and the color shading removed.

[Second Embodiment]

Figure 8:
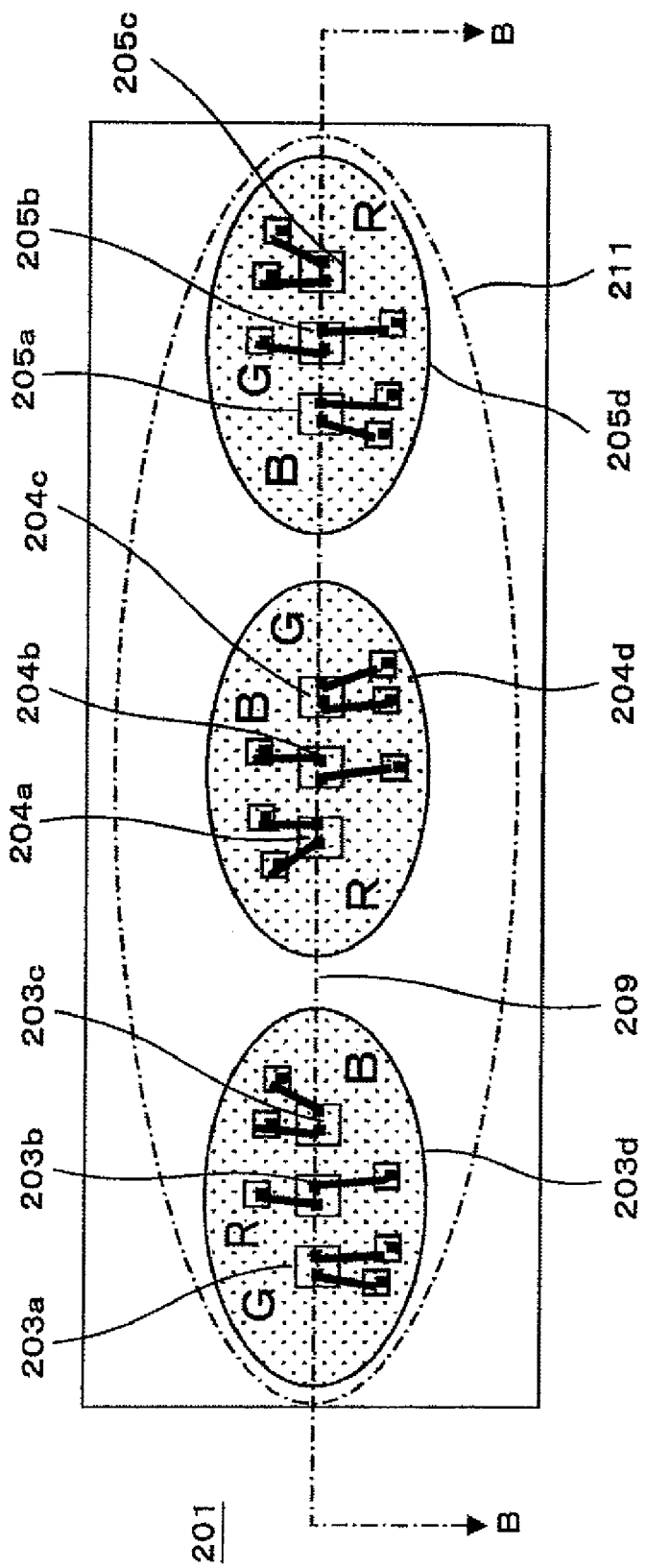
FIG. 8 is a plan view of the light source module according to a second embodiment.

FIG. 8 is a plan view of the light source module 201 according to this embodiment and shows a case in which the three-color RGB chips are arranged repeatedly along the direction of the single symmetry axis 209. The combination of the LED chips differently arranged includes the chip arrangement of GRB, RBG and BGR in that order. In this LED chip combination, the three lenses 203d, 204d and 205d form a paired lens 211. By repeating this arrangement at least once, the light source module 201 is formed.

Figure 9:
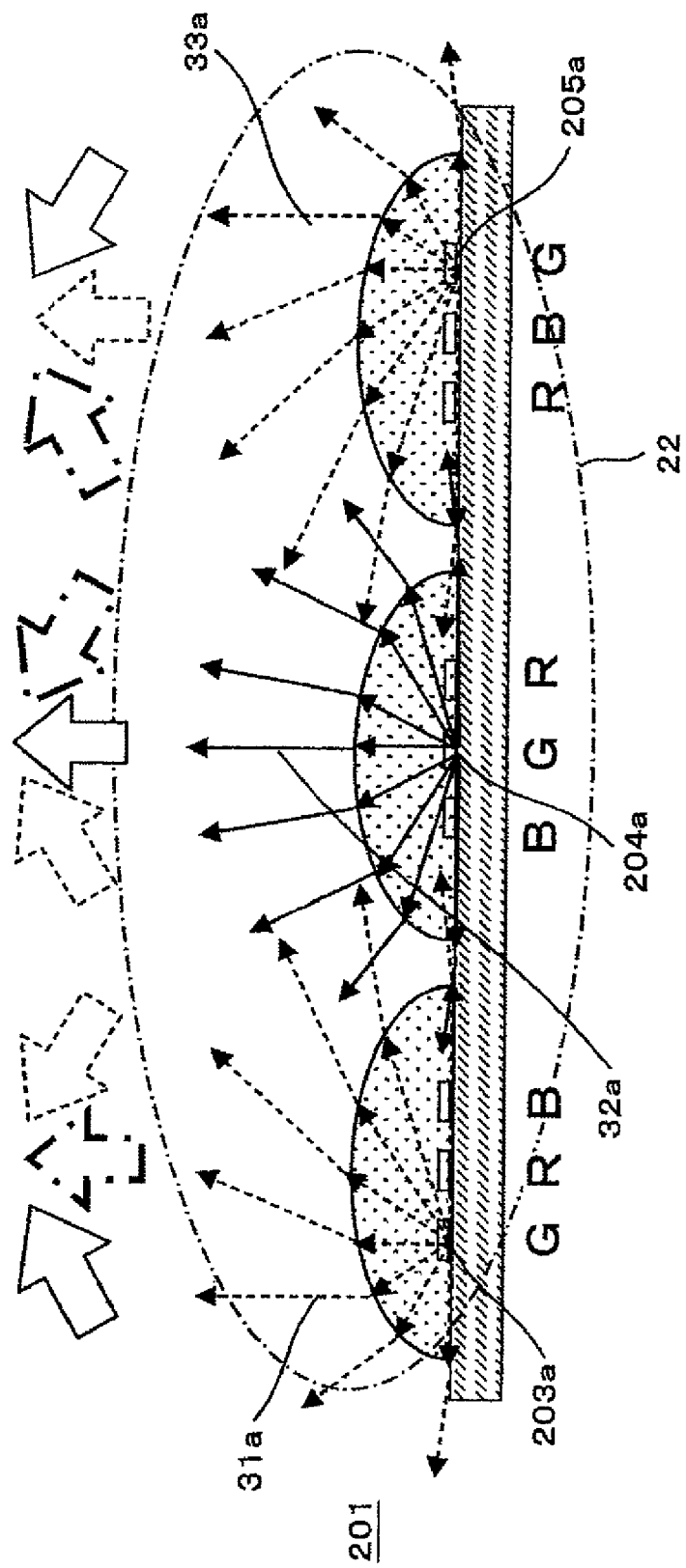
FIG. 9 is a sectional view taken in line B-B' in FIG. 8.

FIG. 9 is a sectional view taken in line B-B' in FIG. 8. As shown in FIG. 9, although the light distribution patterns of light fluxes from the green LED chip 203a, the green LED chip 204a and the green LED chip 205a are different from each other, the light distribution pattern of the paired lens 211 formed of the three lenses having these light distribution patterns is uniform. This is also true for the red LED chip and the blue LED chip as for the green LED chip. By arranging this set of the three LED packages repeatedly, the deviation of the light source module 201 as a whole can be removed to secure the uniform light distribution. As a result, the symmetric arrangement of the LED chips of the three colors RGB can not only reduce the deviation of the light distribution but also assure the coincidence of the light distribution among the three colors RGB. Also as in this embodiment, the deviation of the light distribution can also be reduced by arranging the RGB chips in the order of BRG, RGB and GBR.

Figure 10:
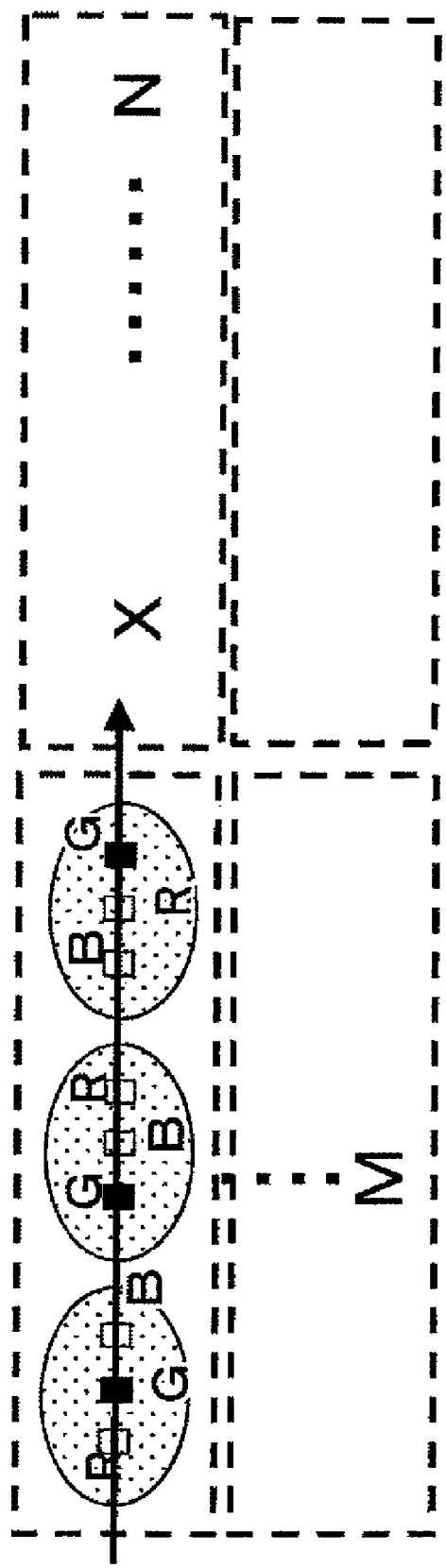
FIG. 10 is a diagram showing the configuration in which the paired lens shown in FIG. 8 is arranged on the flat surface area.

FIG. 10 shows a configuration of the light source module with a number NM of the paired lenses 211 (three-lens units arranged along X axis) arranged on the flat surface area (XY directions). With each three lenses (paired lens 211) defined by dashed line as a basic unit, MN basic units are arranged in lateral and longitudinal directions thereby to secure the uniform light distribution over the entire flat surface area (XY directions).

Figure 11:
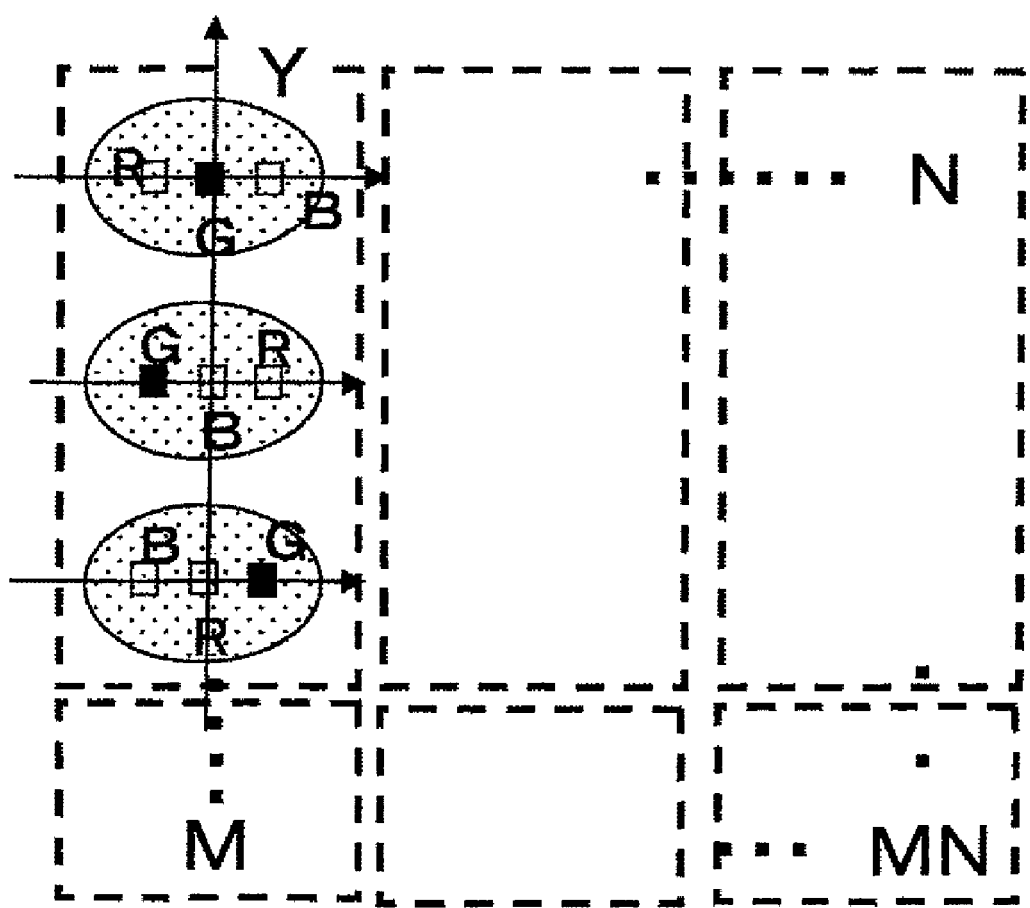
FIG. 11 is another diagram showing the configuration in which the paired lens shown in FIG. 8 is arranged on the flat surface area.

FIG. 11 shows a configuration of the light source module in which the paired lenses 211 (three-lens units) of FIG. 10 are arranged along Y axis and a number NM of the paired lenses 211 are arranged on the flat surface area (XY directions). Like in FIG. 10, with the three lenses (paired lens 211) defined by dashed line as a basic unit, MN basic units are arranged in lateral and longitudinal directions thereby to secure the uniform light distribution over the entire flat area (XY directions).

Though not specifically shown, the one-dimensional arrangement (linear arrangement) only along Y axis, unlike in FIG. 1 or 10, makes it possible to package the LED chips in high density and thus can achieve a high brightness.

[Third Embodiment]

Figure 12:
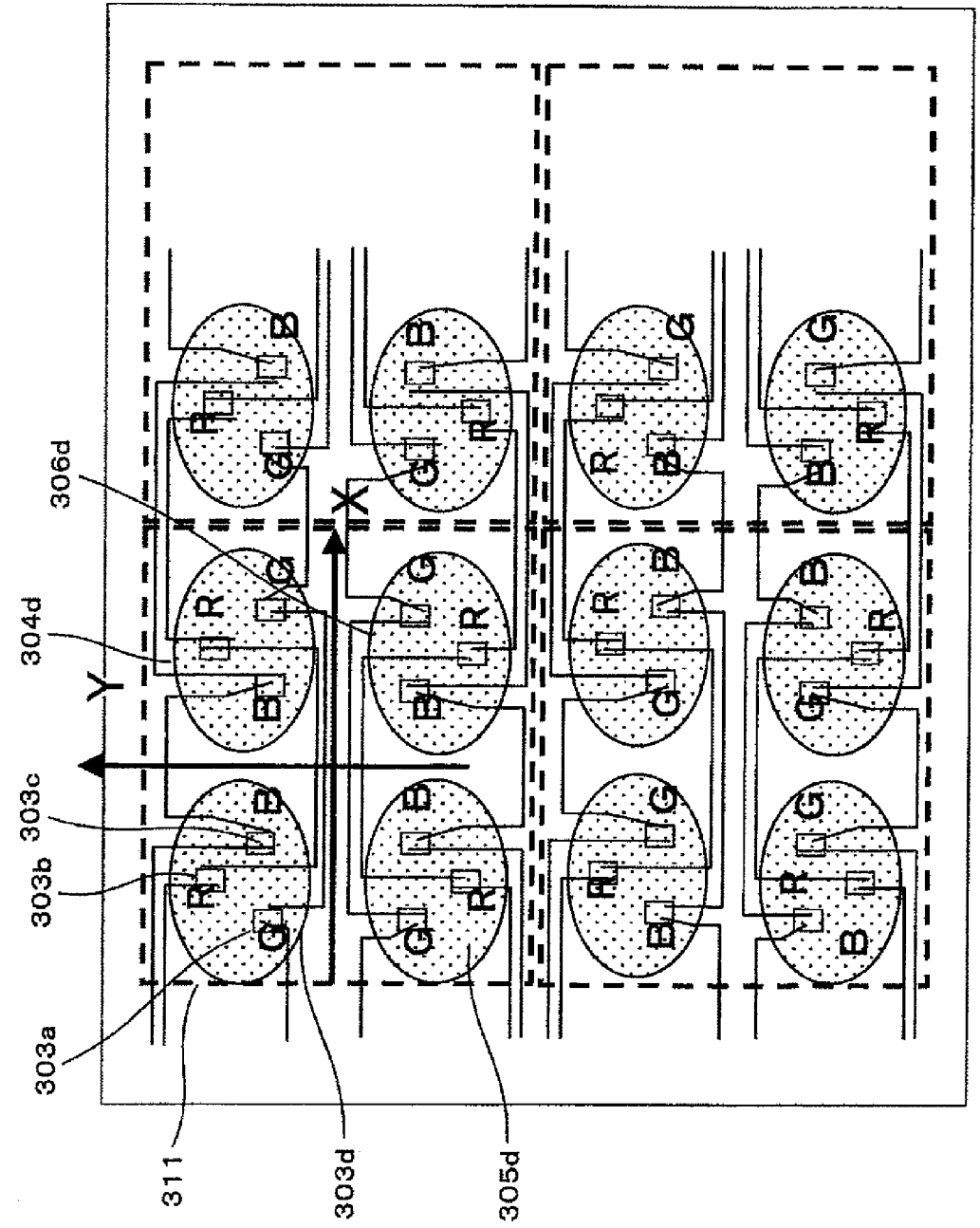
FIG. 12 is a plan view of the light source module according to a third embodiment.

FIG. 12 is a plan view of the light source module according to this embodiment. A paired lens 311 having four adjoining lenses 303d, 304d, 305d and 306d, removes the deviation generated in the directions along two axes for an arrangement of the green LED chip 303a, the red LED chip 303b and the blue LED chip 303c. Specifically, in FIG. 12, the adjoining lenses 303d and 304d, the adjoining lenses 305d and 306d juxtaposed in X direction, and the adjoining lenses 303d and 305d, the adjoining lenses 304d and 306d juxtaposed in Y direction are combined thereby securing a symmetric, uniform light distribution. Here, the RGB chips in the four lenses of the paired lens 311 are arranged symmetrically about the X and Y axes. In FIG. 12, each red LED chip is arranged at the central portion of the three RGB chips along X axis, while the green LED chip and the blue LED chip are arranged symmetrically at the same positions along Y axis. Depending on the positions of the symmetry axes determining the configuration of the paired lens 311 in accordance with the chip arrangement in the lenses, however, the arrangement and the number of the lenses are varied correspondingly.

Figure 13:
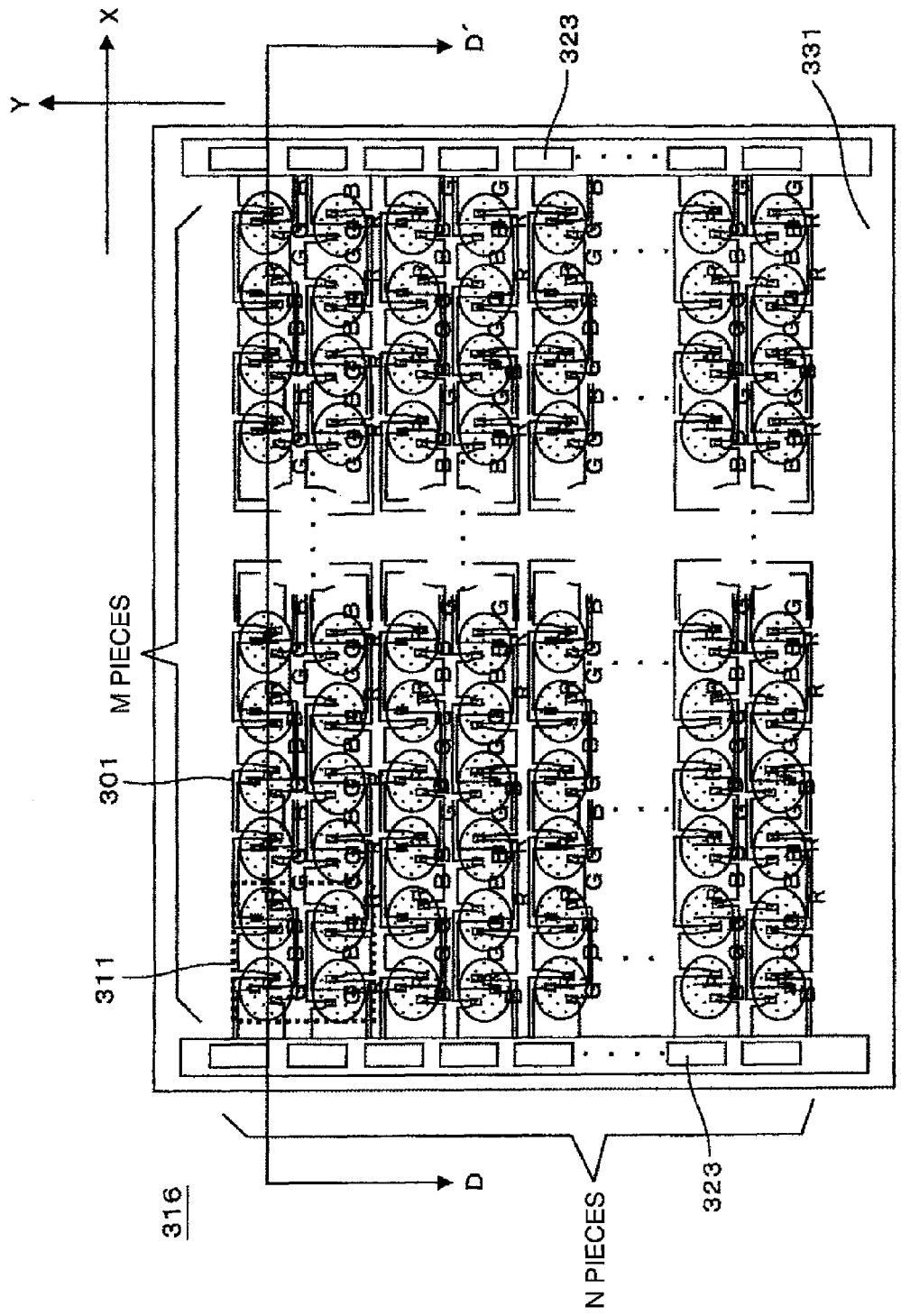
FIG. 13 is a plan view of the back light device shown in FIG. 12.

FIG. 13 is a plan view of the back light device 316 using the paired lenses 311 shown in FIG. 12. The back light device 316 is a light source structure of direct type including a light source module 301 in which the paired lenses 311 are arranged mainly in the number of m along X axis and in the number of n along Y axis for the total of m×n paired lenses 311 mounted on the aluminum support member 331, and a diffusion plate arranged over the light source module 302 through the air to retrieve the light from the flat surface area. The paired lenses 311 are connected in series along X axis and connected to the drive circuits 323 arranged at both ends thereby to realize the areal control function at the one-dimensional level. The light source module 301, being of direct type, is mounted on the aluminum support member 331 as a low heat resistance structure to assure uniform radiation. The paired lenses 311 can be combined in a matrix arrangement of m×n, and therefore, the two-dimensional areal control function can also be realized by using the drive circuits 323 meeting the drive conditions.

Figure 14:
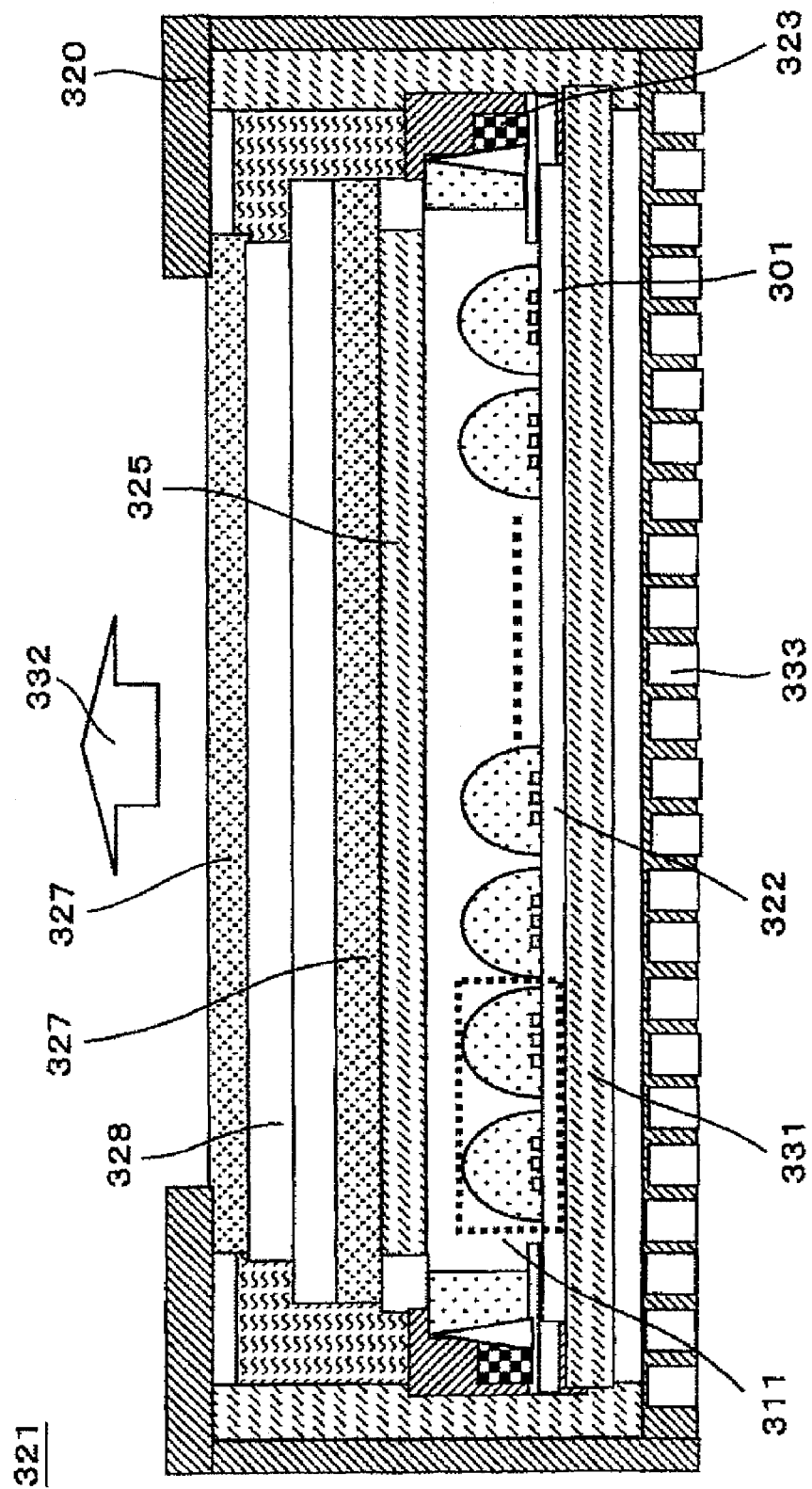
FIG. 14 is sectional view, taken in line D-D', of the image display apparatus using the back light device shown in FIG. 13.

FIG. 14 is a sectional view, taken in line D-D' in FIG. 13, of the image display apparatus 321 using the back light device 316 of direct type. The light flux 332 from the light source module 301 formed on the aluminum support member 331 is retrieved upward through the diffusion plate 325, the optical sheet 327 and the liquid crystal panel 328. The back light device 316 and the liquid crystal panel 328 make up the liquid crystal display apparatus. By appropriately combining the paired lenses 311 as basic units, a uniform brightness distribution free of deviation is realized. On the lower side (the side opposite in direction to the side from which the light is retrieved) of the light source module 301, the wiring board 322 having a high heat conductivity for securing the radiation is fixed on the aluminum support member 331 with adhesive tape (not shown) to radiate heat from the opening 333 formed on the housing 320.

[Fourth Embodiment]

Figure 15:
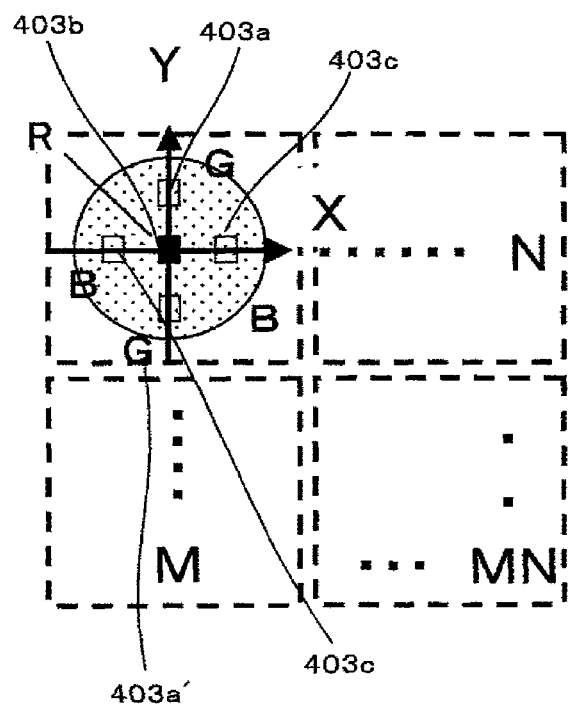
FIG. 15 is a plan view of the light source module according to a fourth embodiment.

FIG. 15 shows still another embodiment of the invention having a configuration in which the RGB chips are arranged in one lens. Specifically, this embodiment represents a case in which the RGB chips are arranged symmetrically about the center on the X and Y axes as center axes in one lens. These lenses are arranged in the number of MN along XY directions on the flat surface area. In each lens, the red LED chip 403b is arranged at the center, two green LED chips 403a and 403a' are arranged symmetrically about the center on Y axis and so are two blue LED chips 403c and 403c' symmetrically about the center on X axis thereby to assure the uniform light distribution from the LED chips of the three colors RGB. According to this embodiment, the uniform light distribution is achieved by arranging a plurality of chips symmetrically about the center of a single lens. Specifically, the uniform light distribution is achieved by combining not a plurality of lenses but a plurality of chips. Alternatively, the blue LED chip or the green LED chip, instead of the red LED chip, may be arranged at the center of the lens to achieve the uniform light distribution.

[Fifth Embodiment]

Figure 16:
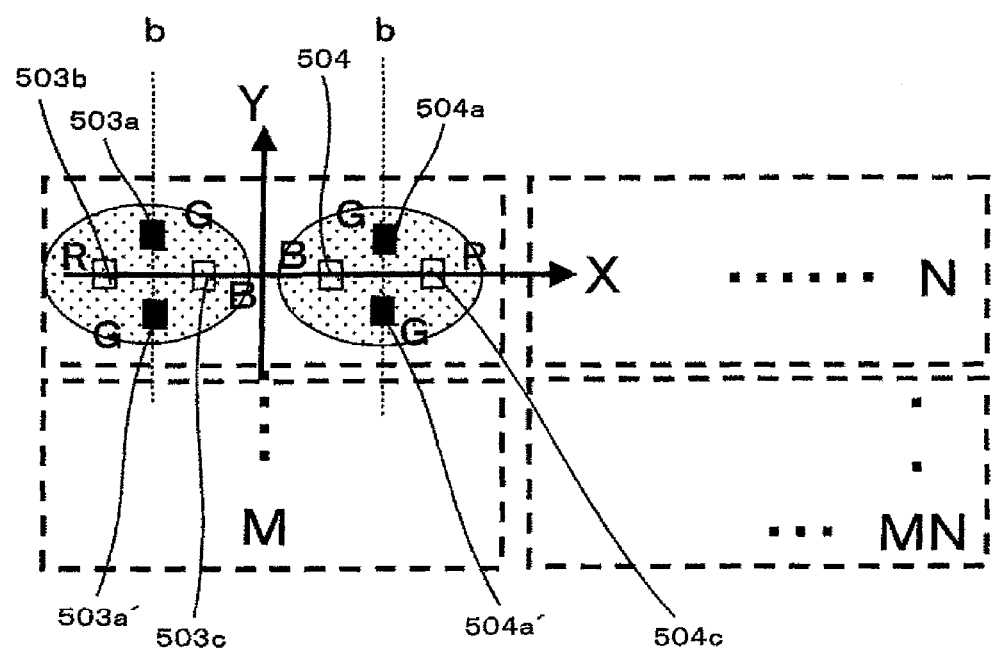
FIG. 16 is a plan view of the light source module according to a fifth embodiment.

FIG. 16 shows a yet another embodiment of the invention in which a single chip otherwise arranged at the center of each lens along X axis is divided into two parts symmetric about the lens center along Y axis. FIG. 16 shows a case in which two green LED chips are used to secure the white balance in view of the fact that the LED chips of the three colors RGB are different in optical output from each other. The two green LED chips are symmetric about the lens center, and therefore, the uniformity in light distribution is secured in the same manner as in the case where one green LED chip is arranged at the center position. Also, as in the case shown in FIG. 3, the two lenses (paired lens) defined by dashed line constituting basic units are arranged in the number of MN in lateral and longitudinal directions thereby to secure the uniformity of light distribution on the flat surface area (along XY axes). Incidentally, the uniformity of light distribution can be secured also in the case where two red LED chips or two blue LED chips, instead of two green LED chips, are used.

[Sixth Embodiment]

Figure 17A:
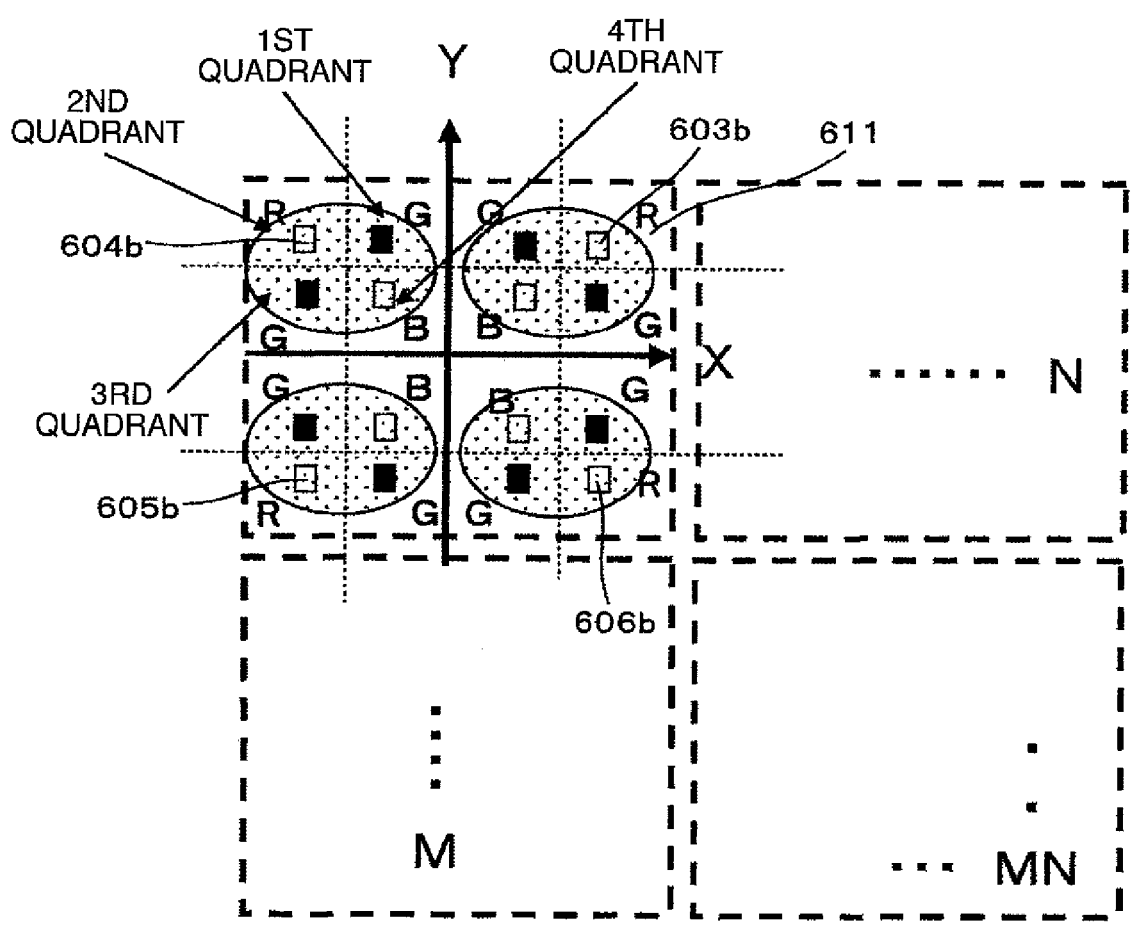
FIG. 17A is a plan view of the light source module according to a sixth embodiment.

FIG. 17A shows a further embodiment of the invention, in which the light source module is configured of a number NM of paired lenses 611 each including one red LED chip, one blue LED chip and two green LED chips (a configuration with lenses arranged along two axes of X and Y) are arranged on the flat surface area (along XY directions). By arranging MN basic units each including four lenses (paired lens 611) defined by dashed line in longitudinal and lateral directions, the uniformity of light distribution is secured on the flat surface area (along XY directions). In each paired lens 611, the chips are arranged in the four areas, segmented by X and Y axes forming symmetry axes in the paired lens 611, with a predetermined regularity to secure the uniformity of light distribution. The LED chips of three RGB colors are arranged symmetrically in the four areas (corresponding to the first, second, third and fourth quadrants) into which each lens is divided by the symmetry axes. Specifically, with the lens 603 as a starting point, the red LED chips are arranged in the first, second, third and fourth quadrants in that order counterclockwise in the respective lenses partitioned by X and Y axes as symmetry axes of the paired lens 611. As a result, the four red LED chips are arranged symmetrically along X and Y axes in the X-Y coordinate with the center of the four lenses as an origin. This is also the case with the blue LED chips which, like the corresponding red LED chips, are arranged in the third, fourth, first and second quadrants in that order counterclockwise starting with the lens 603. This arrangement is the result of taking note of the fact that the red and blue LED chips have different light distribution characteristics in the four paired lenses 611 (the lenses arranged in the four quadrants) and that each pair of the opposite lenses have a symmetric light distribution characteristic. In this way, a uniform light distribution characteristic free of deviation is obtained by the set of the four paired lenses 611. With regard to the green LED chips, two each of them are arranged symmetrically in other than the quadrants where the red and blue LED chips are arranged.

The LED chips shown in FIG. 17A are arranged in matrix as a schematic illustration in FIG. 17B. In FIG. 17B, the column corresponds to the direction along the long axis of the panel, and the row corresponds to the direction along the short axis of the panel. The first, fifth, ninth and 13th LED chips indicate the first emitted light color. The second, sixth, tenth and 14th LED chips indicate the second emitted light color. The third, fourth, seventh, eighth, 11th, 12th, 15th and 16th LED chips indicate the third emitted light color. By arranging the 16 LED chips as one unit with each four LED chips along rows and columns as shown in FIG. 17B, the uniformity of light distribution can be secured for each paired lens.

According to this embodiment, the chips are arranged symmetrically in the four areas (first, second, third and fourth quadrants) into which each lens is divided by the symmetry axes thereof. Thus, an ample distance between chips can be secured to prevent both the absorption loss and the absorption-emission. Incidentally, the green LED chips are arranged symmetrically about the center of each lens, and therefore, have a uniform light distribution characteristic free of deviation. A uniform light distribution characteristic free of deviation can be secured also in the case where one green LED chip is arranged at the center of each lens. In this case, each green LED chip can be increased in size as compared with the LED chips of the other colors taking the white balance into consideration.

Figure 18:
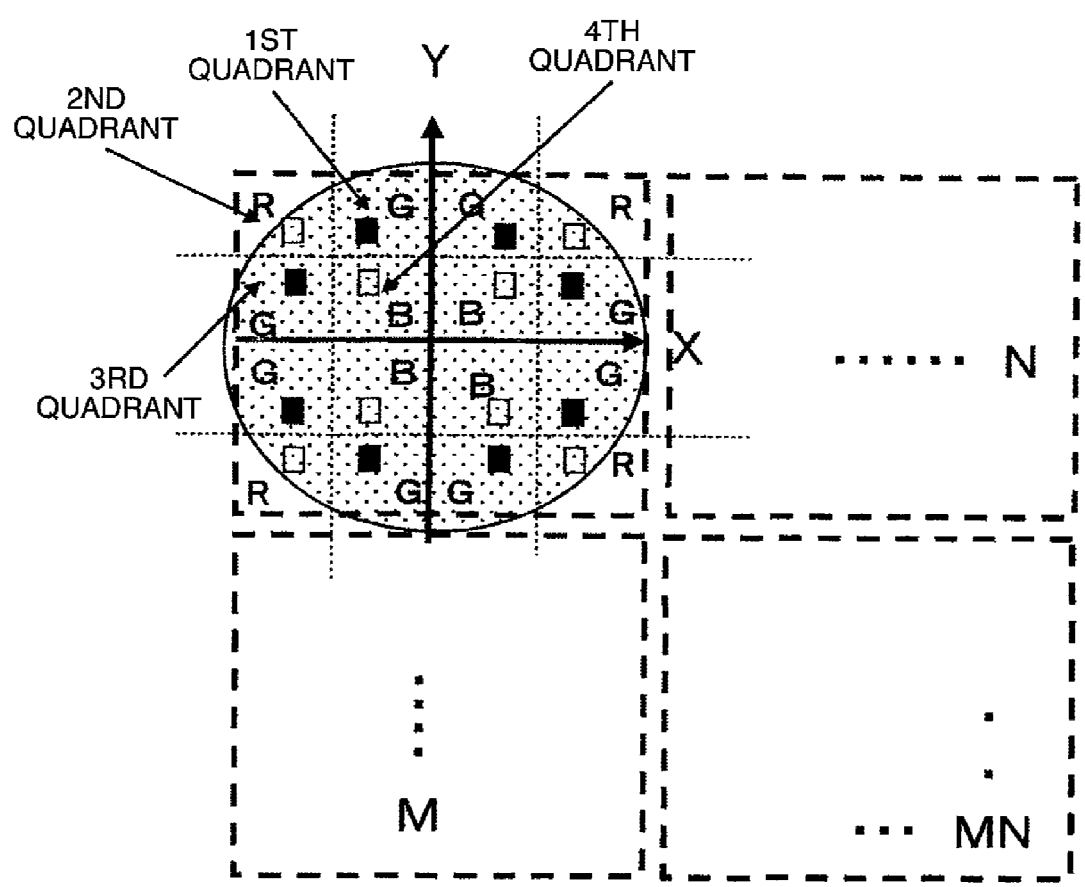
FIG. 18 is still another plan view of the light source module according to the sixth embodiment.

Also, according to this embodiment, the uniform light distribution characteristic free of deviation can be obtained also in the case where one lens, instead of four lenses, makes up a paired lens as shown in FIG. 18.

Although this embodiment represents a case in which each paired lens is divided into four parts by X and Y axes, the uniform light distribution characteristic can be obtained and the chromaticity difference removed also by for 2k (k=2, 3, . . . ) division, as long as the aforementioned two features, that is different for each of 2k paired lenses (arranged in 2k symmetric areas) and the light distribution characteristics of each pair of opposite lenses are symmetric, are satisfied.

[Seventh Embodiment]

Figure 19:
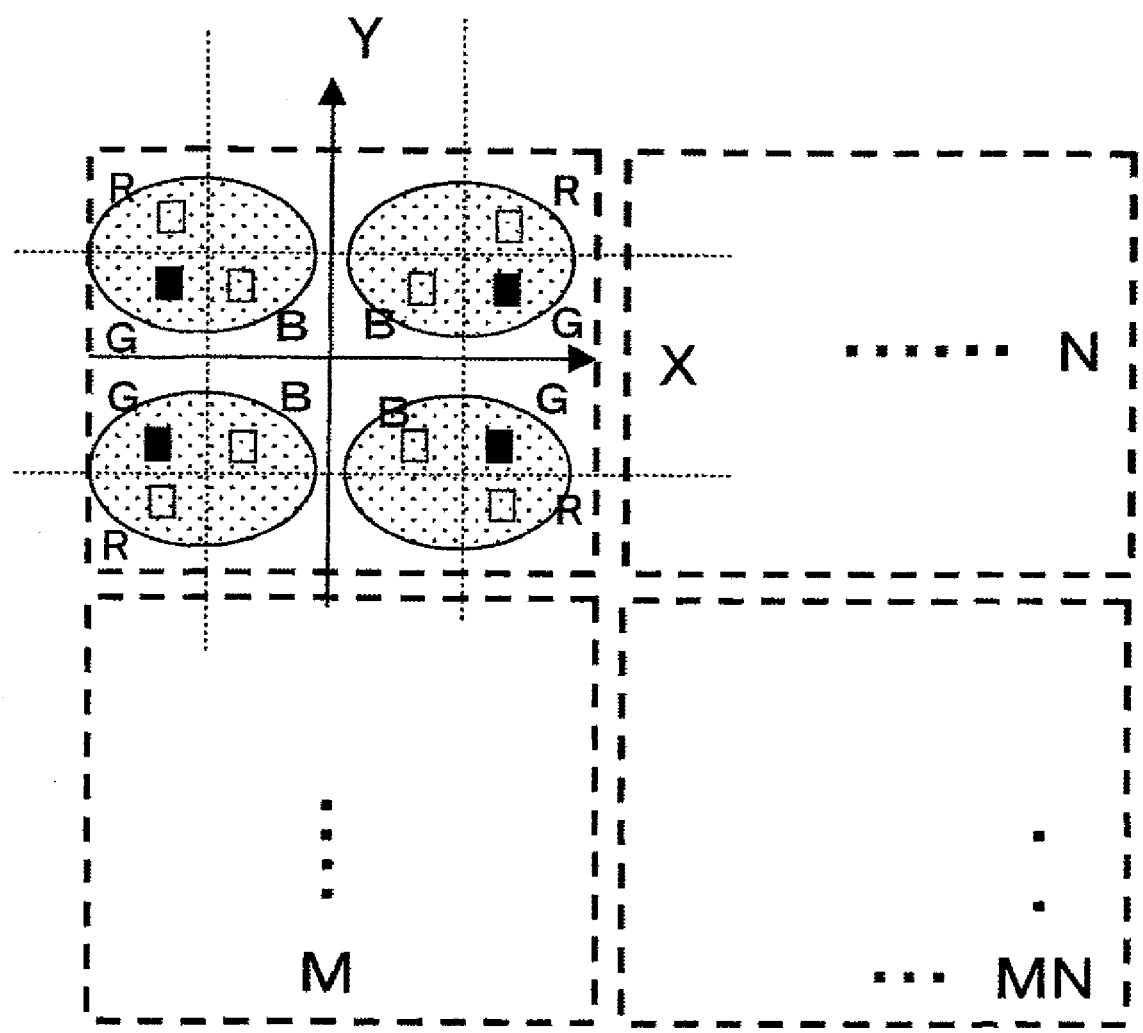
FIG. 19 is a plan view of the light source module according to a seventh embodiment.
Figure 20:
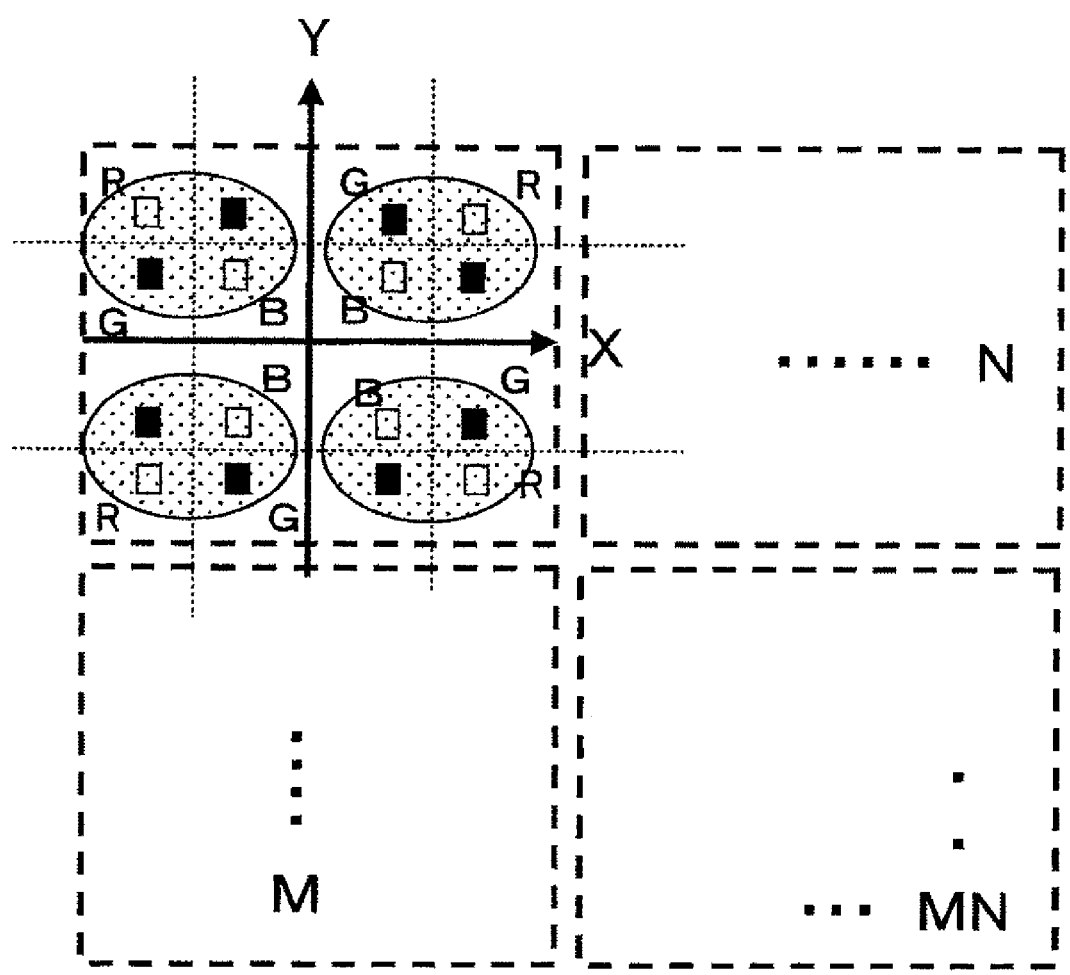
FIG. 20 is another plan view of the light source module according to the seventh embodiment.
Figure 21A:
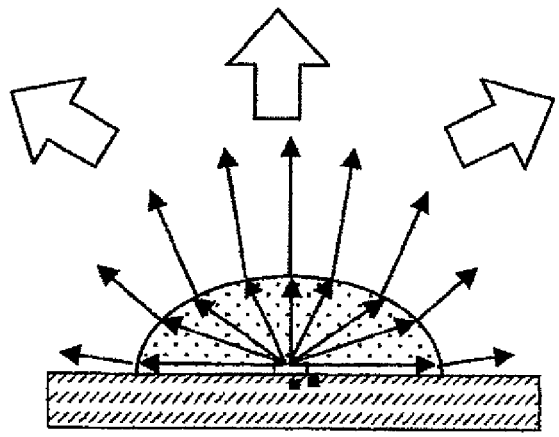
FIGS. 21A to 21C are sectional views, showing the light distribution, of the LED chip arrangement structure and the lens shape.
Figure 21B:
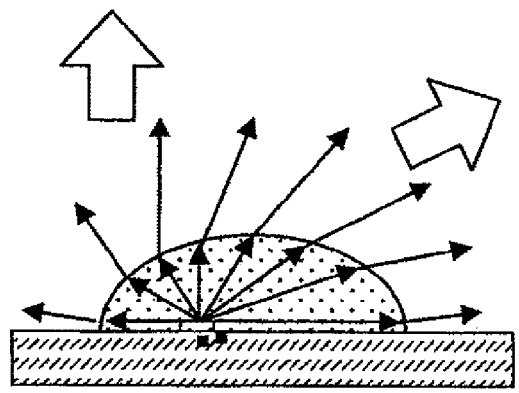
Figure 21C:
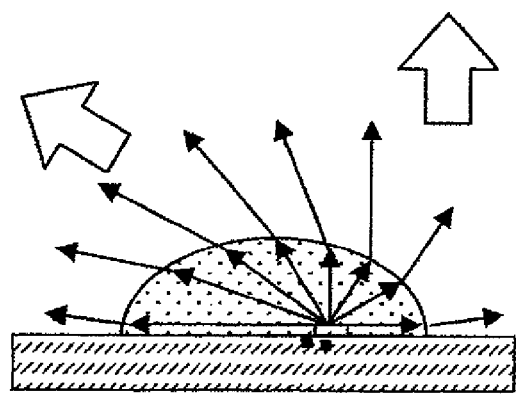

FIG. 19 shows a yet further embodiment of the invention, in which only one of the two green LED chips is used in each quadrant in FIG. 17. In this case, the green LD chip functions under the same conditions as the red LED chip and the blue LED chip. Also in this case, the uniformity of the light distribution characteristic can be achieved, and the deviation and the chromaticity difference removed. Also, the uniform light distribution characteristic can be secured while at the same time removing the deviation and the chromaticity difference, even in the case where another chip is arranged in the place from which the green LED chip is removed as shown in FIG. 20.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display apparatus comprising:
a liquid crystal panel; and
a back light device having a plurality of light sources arranged in matrix to emit the light from the plurality of the light sources to the liquid crystal panel through a lens;
wherein the back light device includes a first LED chip for emitting the light of a first color, a second LED chip for emitting the light of a second color, a third LED chip for emitting the light of a third color, a fourth LED chip for emitting the light of the third color, a fifth LED chip for emitting the light of the first color, a sixth LED chip for emitting the light of the second color, a seventh LED chip for emitting the light of the third color, an eighth LED chip for emitting the light of the third color, a ninth LED chip for emitting the light of the first color, a tenth LED chip for emitting the light of the second color, an 11th LED chip for emitting the light of the third color, a 12th LED chip for emitting the light of the third color, a 13th LED chip for emitting the light of the first color, a 14th LED chip for emitting the light of the second color, a 15th LED chip for emitting the light of the third color and a 16th LED chip for emitting the light of the third color;
wherein the first LED chip, the third LED chip, the seventh LED chip and the fifth LED chip are arranged in that order on a first column in the direction along the long axis of the liquid crystal panel;
wherein the fourth LED chip, the second LED chip, the sixth LED chip and the eighth LED chip are arranged in that order on a second column in the direction along the long axis of the liquid crystal panel;
wherein the 12th LED chip, the tenth LED chip, the 14th LED chip and the 16th LED chip are arranged in that order on a third column in the direction along the long axis of the liquid crystal panel;
wherein the ninth LED chip, the 11th LED chip, the 15th LED chip and the 13th LED chip are arranged in that order on a fourth column in the direction along the long axis of the liquid crystal panel;
wherein the first LED chip, the fourth LED chip, the 12th LED chip and the ninth LED chip are arranged in that order on a first row in the direction along the short axis of the liquid crystal panel;
wherein the third LED chip, the second LED chip, the tenth LED chip and the 11th LED chip are arranged in that order on a second row in the direction along the short axis of the liquid crystal panel;
wherein the seventh LED chip, the sixth LED chip, the 14th LED chip and the 15th LED chip are arranged in that order on a third row in the direction along the short axis of the liquid crystal panel; and
wherein the fifth LED chip, the eighth LED chip, the 16th LED chip and the 13th LED chip are arranged in that order on a fourth row in the direction along the short axis of the liquid crystal panel.

2. The liquid crystal display apparatus according to claim 1, comprising a plurality of the lenses;
wherein the first LED chip, the second LED chip, the third LED chip and the fourth LED chip are covered by the first lens;
wherein the fifth LED chip, the sixth LED chip, the seventh LED chip and the eighth LED chip are covered by the second lens;
wherein the ninth LED chip, the tenth LED chip, the 11th LED chip and the 12th LED chip are covered by the third lens; and
wherein the 13th LED chip, the 14th LED chip, the 15th LED chip and the 16th LED chip are covered by the fourth lens.

* * * * *